Feb. 9, 1926.

G. A. BUVINGER ET AL 1,572,231

PUMPING APPARATUS

Filed March 30, 1923     4 Sheets-Sheet 1

Feb. 9, 1926. 1,572,231
G. A. BUVINGER ET AL
PUMPING APPARATUS
Filed March 30, 1923 4 Sheets-Sheet 3
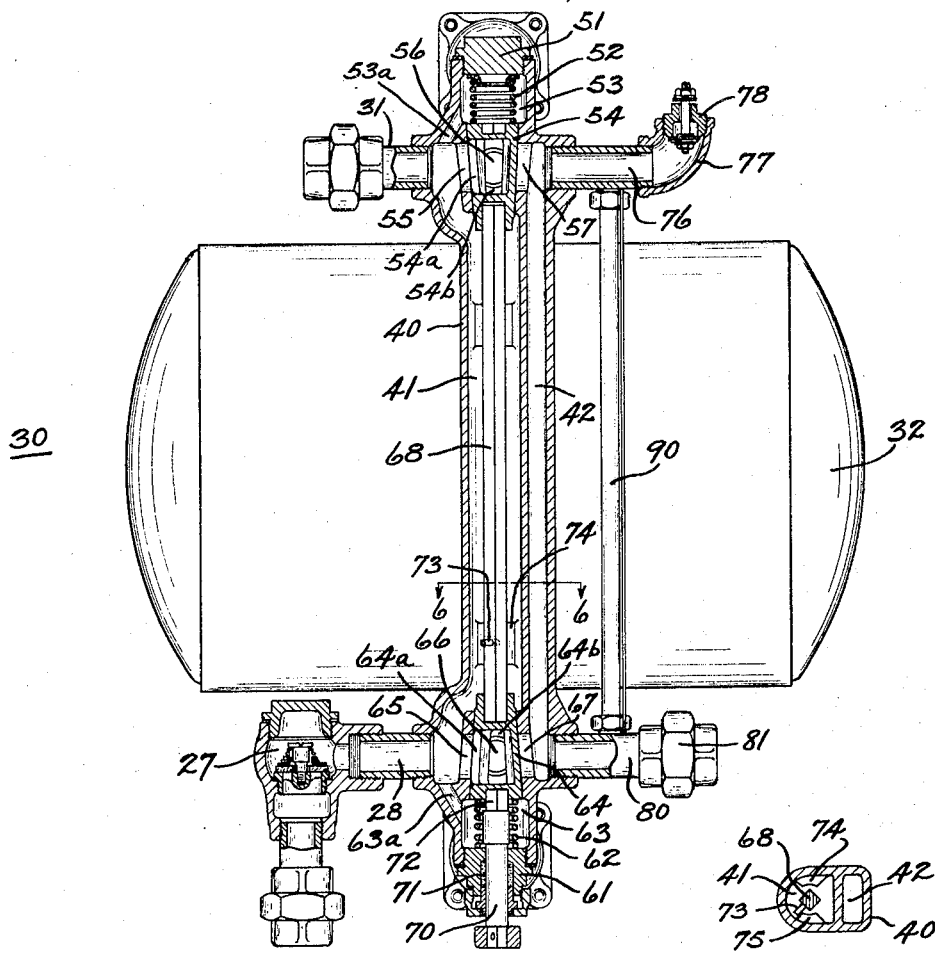
Fig. 3
Fig. 6
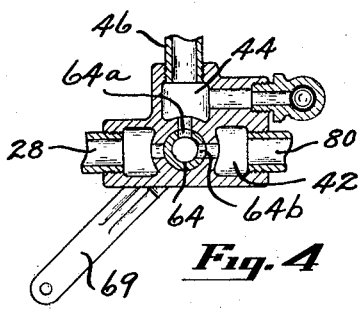
Fig. 4
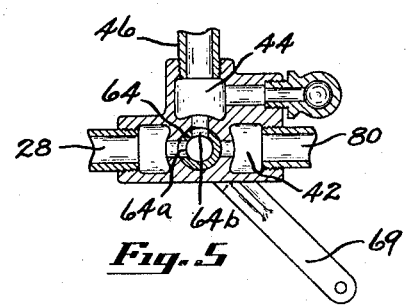
Fig. 5
Witnesses
Lloyd M. Keighley
Warren Schmieding
Inventors
GEORGE A. BUVINGER,
CLARENCE WARNER
AND JASPER A. SMITH.
By J. Ralph Fehr
Their Attorney

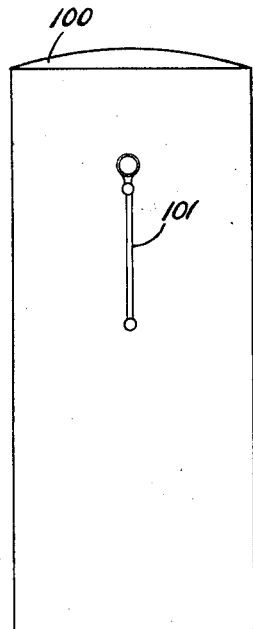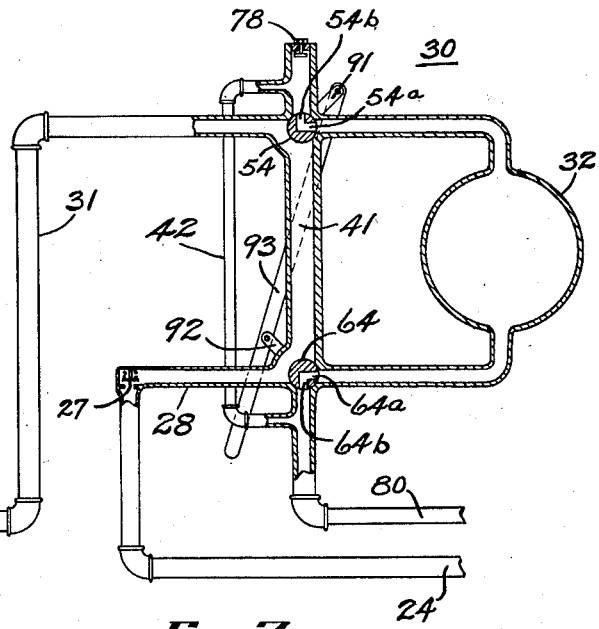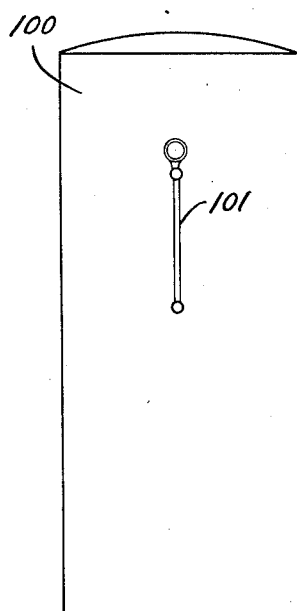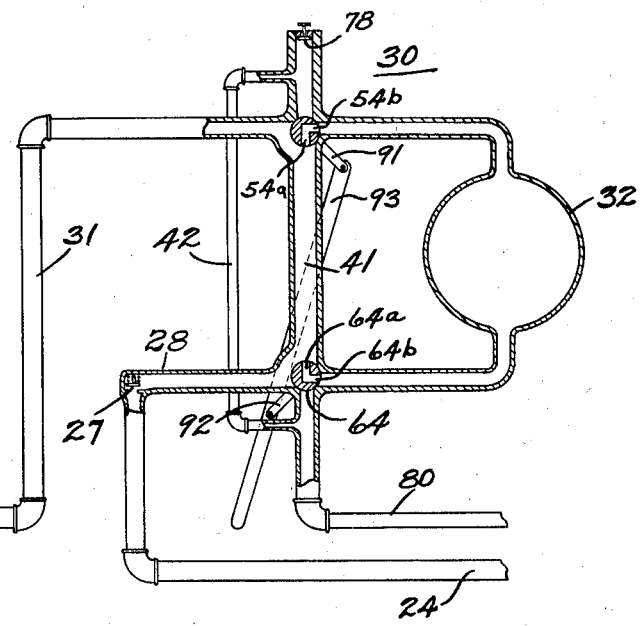

Patented Feb. 9, 1926.

1,572,231

UNITED STATES PATENT OFFICE.

GEORGE A. BUVINGER, CLARENCE WARNER, AND JASPER A. SMITH, OF DAYTON, OHIO, ASSIGNORS TO DELCO-LIGHT COMPANY, OF DAYTON, OHIO, A CORPORATION OF DELAWARE.

PUMPING APPARATUS.

Application filed March 30, 1923. Serial No. 628,799.

*To all whom it may concern:*

Be it known that we, GEORGE A. BUVINGER, CLARENCE WARNER, and JASPER A. SMITH, citizens of the United States of America, residing at Dayton, county of Montgomery, State of Ohio, have invented certain new and useful Improvements in Pumping Apparatus, of which the following is a full, clear, and exact description.

This invention relates to pumping systems which include a pressure tank in which water is stored under pressure so that a quantity of water can be used before it is necessary to operate the pump to supply the demand.

In order that any substantial quantity of water can be made available for discharge under pressure from the storage tank, a substantial quantity of air must be confined under pressure above the surface of the liquid in the tank.

In using a pressure tank, it is very desirable to get out of that tank as much water as possible, between the high pressure point and the low pressure point. In order to do this, the quantity of air in the tank must be kept at a fairly constant level. Since a certain amount of air in the tank is continually being absorbed by the water and carried away, it is necessary to force additional air into the tank from time to time, in order to keep the water line from the top of the tank.

The air in the tank above the liquid level functions as a spring which can be compressed and therefore serve as means for storing energy for forcing the water out of the tank under pressure. If there is only a small volume of air in the tank, the spring which forces out the water is very short and therefore is not able to discharge at the faucet as much water as if it were longer. The only way to lengthen the air spring in the pressure tank is to put more air into the tank.

Auxiliary air pumps have been used in connection with water supply systems for introducing air under pressure into the water storage tank. It is an object of this invention to provide means for providing the storage tank with air under pressure without requiring the use of an auxiliary air pump, and without discontinuing the water supply.

More particularly it is an object of the invention to use the water pump itself as the source of pressure supply for causing air to be forced into the storage tank under pressure. The disclosed embodiment of the invention involves the use of a chamber in which a quantity of air can be collected, and then forced out by sending through it a quantity of water discharged from the pump, the water forcing the air out of the chamber into the pressure tank. The apparatus disclosed herein may be called an air charger.

A further object of the invention is to provide a unitary structure embodying an air charger of the type referred to which can be installed in existing forms of pumping apparatus involving the use of a pressure tank without disturbing the pump or the pressure tank and with the use of the minimum number of piping connections with the water supply system.

Other and further objects and advantages of the present invention will be apparent from the following description of a preferred form thereof, reference being made to the accompanying drawings.

In the drawings:

Fig. 3 is a sectional view taken on the line 3—3 of Fig. 2;

Fig. 4 is a sectional view taken on the line 4—4 of Fig. 2, showing a portion of the valve mechanism in one of its operating positions;

Fig. 5 is a view similar to Fig. 4 with the valve in a different position;

Fig. 6 is a sectional view taken on the line 6—6 of Fig. 3; and

Figs. 7 and 8 are piping diagrams for illustrating the operation of the air charger.

Figure 1:
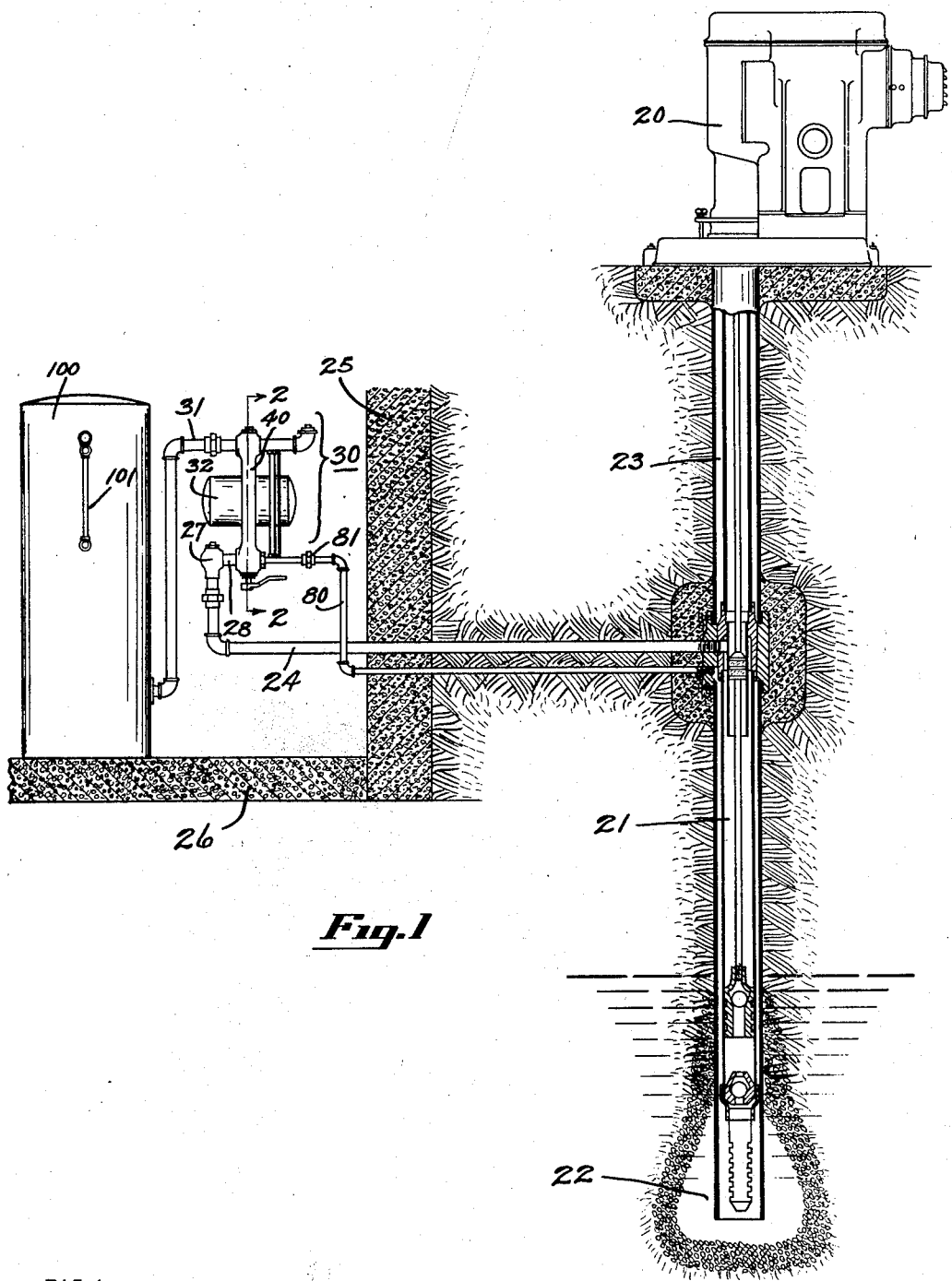
Fig. 1 shows elevations of a pump driving mechanism, the pressure tank, and the air charger, together with connections with the pump which is shown in section.
Figure 2:
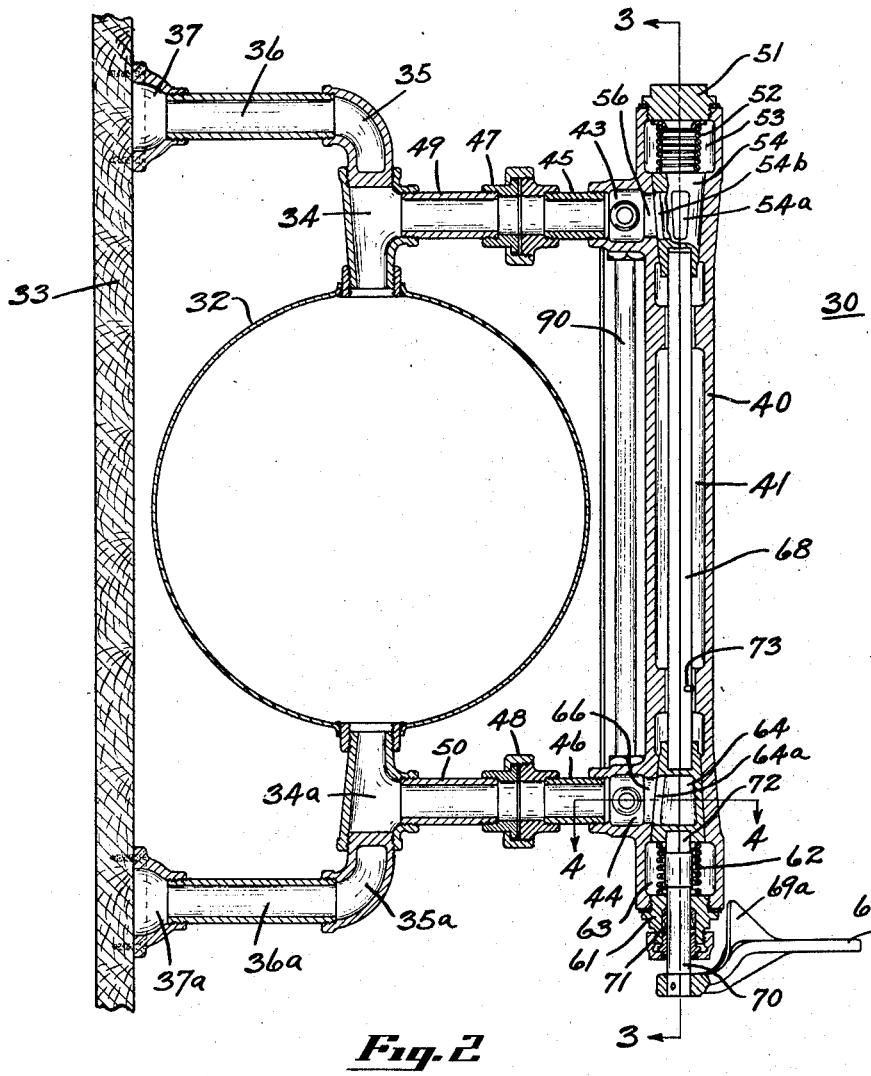
Fig. 2 is a sectional view of the air charger taken on the line 2—2 of Fig. 1.

A pump driving mechanism or power head 20 shown in Fig. 1 operates a deep well pump 21 projecting into a well of water 22 and supported within a well casing 23 having a discharge outlet pipe 24 which projects through the wall 25 of a frost proof pit or cellar, the floor of which is indicated at 26. The pipe 24 is connected with a check valve 27 connected by pipe 28 with the air charger unit designated as a whole by numeral 30. The water and air outlet connection between air charger 30 and the storage tank 100 is provided by means of piping 31. The tank 100 is provided with a sight glass 101 for indicating the water level in the tank 100. The tank 100 is connected with a water distribution system not shown.

The air charger 30 includes a tank 32 within which air for charging the pressure tank 100 can be collected. Tank 32 is attached to a wall 33 by means of two brackets, namely, an upper bracket including a T 34, a blind L 35, a pipe 36, and a flange mounting 37, and a lower bracket comprising the corresponding parts 34ª, 35ª, 36ª, and 37ª.

The air charger 30 includes also a valve body 40 extending above and below the tank 32 and provided with passages 41 and 42. Passage 41 is connected at its lower end with the pipe 28 and at its upper end with the piping 31. Passage 41 may be placed in communication with passages 43 and 44 connected by pipes 45 and 46 respectively with pipe unions 47 and 48 respectively which are connected with pipes 49 and 50 respectively connected with T's 34 and 34ª respectively.

A plug 51 screw threaded into the upper end of the valve body 40 presses a spring 52 confined within a recess 53 against a tapered valve 54 having a tapered seat provided with openings 55, 56, and 57 communicating respectively with passages 41, 43, and 42. A plug 61 screwed into the lower end of valve body 40 presses a spring 62 located in a recess 63 against a tapered valve 64 cooperating with a tapered seat provided with ports or openings 65, 66, and 67 communicating respectively with passages 41, 44, and 42.

The two valves 54 and 64 are connected by a rod 68 and both valves are operated simultaneously by means of a lever 69 attached to a shaft 70 passing through a stuffing box 71 of which the plug 61 is a part. The shaft 70 has a squared end 72 for engaging a square recess in the valve 64. Valves 54 and 64 are provided respectively with passages 54ª, 54ᵇ and 64ⁿ, 64ᵇ. Passages 64ª and 54ª are arranged preferably in the same vertical plane which is at right angles to the plane of passages 64ᵇ and 54ᵇ. The angular rotation of valves 54 and 64 is limited by means of a pin 73 mounted on rod 68 engaging with lugs 74 and 75 formed on the inner wall of passage 41.

Passage 42 is connected by pipe 76 with an L 77 provided with a check valve 78 which will permit the entrance of air into the charger but will check the passage of fluid out through the pipe 76. Passage 42 is connected at its lower end with the piping connections 80 including a pipe union 81 through which water may be drained from the tank 32 and returned to the well if desired or may be drained into a waste sewer.

The operation of the air charger is as follows: Normally the apparatus is in a position shown in Figs. 3, 5, and 8. Referring to Fig. 8, it will be noted that water discharged from the pump into the tank 100 can pass through the passage 41 and also through the tank 32 which is connected in shunt with the passage 41. Therefore the tank 32 normally contains water, the draining of this tank being prevented by means of check valve 27 and by virtue of the valve 64 closing the tank 32 from the outlet or drain pipe 80. In order to fill the tank 32 with air valves 64 and 54 are moved 90° to the positions shown diagrammatically in Fig. 7. Fig. 4 shows valve 64 in its new position and the position of valve 54 is similar thereto. Although the pumping mechanism may still be in operation and water be flowing through the passage 41 into the tank 100, the tank 32 can now be drained since both tank 32 and the drain 80 are vented to atmosphere. When tank 32 is empty as indicated by the water level sight tube 90, connecting passages 43 and 44, the valves 54 and 64 are returned to the position indicated in Fig. 8. Some of the water being pumped through pipe 24 will be forced into the tank 32 carrying the air collected in tank 32 over into the tank 100 while tank 32 is filled with water again.

The water level sight glass 101 on the tank 100 will indicate the amount of air contained in the tank 100. When the water disappears entirely from the glass 101, it is an indication that water should be pumped into tank 100; and, when the glass 101 is entirely filled with water, this is an indication that it is necessary to operate the air charger again in order to maintain the necessary amount of air for pressure storage in the tank 100.

In the piping diagram shown in Figs. 7 and 8, the valves 54 and 64 are shown connected by means of arms 91 and 92 and a link 93. This is but a diagrammatic representation of the structure shown in the other figures.

The air charger 30 may be assembled and transported as a unitary structure for installation in a water system. The mounting of the charger upon a wall near the pressure tank is exceedingly simple. Only three piping connections need be made, namely, two connections in the discharge line from the pump to the pressure tank and one connection from the tank drain pipe of the air charger. The operation of the device is exceedingly simple. There is but one operating handle and it is moved into two positions only. The maintenance of the device requires very little attention since there are no moving parts to be lubricated and there is practically no wear on the apparatus.

It is to be noted that the valve body 40 is symmetrical with respect to the horizontal axis of the tank 32. Should it be desirable to extend the pipes 28 and 31 to the right of the valve body instead of to the left as shown in Fig. 3, the apparatus could be assembled with the valve body 40 inverted with respect to its position shown in Fig. 3. The tapped holes adjacent the top of the valve for receiving pipes 31, 45 and 76 are adapted respectively to receive pipes 28, 46 and 80, and vice versa. In other words, to make an inverted installation, exchange the connection from the pump with the connection to the storage tank, exchange the connection with the top of the air tank with the connection to the bottom of the air tank, and exchange the connection to the air inlet pipe with the connection to the air tank drain. The handle 69 is provided with a pointer 69ª for pointing to indicia such as the words "Drain" and "Charge" to indicate the status of the valve mechanism. The indicia are placed both at the top and bottom of the valve body 40 so as to provide for installing the lever 69 below the tank 32 regardless of whether the valve body is installed as shown in Fig. 3 or is inverted. If it were as convenient to manipulate the lever 69 at a position above the tank 32, then it would not be necessary to make an assembly of the valve mechanism, differing from that shown in Fig. 3 when desired to make a reversal of the installation. The functions of valves 54 and 64 would simply be exchanged.

Spring chambers 53 and 63 are connected by passages 53ª and 63ª, respectively, with passage 41 in order that water may be conducted adjacent both ends of the valves 54 and 64 during the operation of the water system. Water pressure is used to assist the springs in maintaining the valves upon their seats.

If water should be forced into the air inlet pipe 76 while the valve 54 is being turned or in case the valve 54 should be left in an intermediate position the check valve 78 will prevent escape of water, and pipe 76 can be drained by passage 42.

One of the principal advantages of the present invention resides in the ability to charge the storage tank with air without stopping the flow of water from the pump to the storage tank or reducing the pressure therein. In any position of the valve mechanism, whether in "Drain" or "Charge" or in any intermediate position, the pump is never cut off because water can always flow through the passage 41 which constitutes a part of the main passage from the pump to the storage tank. The air tank 32 is simply a part of a duct by-passing a portion of the main passage. The valve mechanism cuts the air tank 30 off from the passage 41 while tank 30 drains and fills with air, without interfering with water flow in passage 41. Then the by-pass or air tank 32 can be connected above and below it with the passage 41 without stopping water flow to the storage tank.

Should the air charger be located in a pit or if the device is located in the basement and it is desirable to operate the same from the room above, the valve operating shaft 70 is connected to the upper valve, instead of the lower as shown, and the shaft 70 is of such a length that the operating lever 69 can be operated above ground or from the room above.

While the form of mechanism herein shown and described constitutes a preferred embodiment of one form of invention, it is to be understood that other forms might be adopted and various changes and alterations made in the shape, size and proportion of the elements therein without departing from the spirit and scope of the invention.

What is claimed is as follows:

1. In a water system, the combination with a pump and a pressure storage tank; of a main duct connecting the pump and tank; a duct by-passing a portion of the main duct; and means for introducing air into the by-pass duct and for causing air to be forced by the flow of water in said main duct from the by-pass duct into the tank.

2. In a water system, the combination with a pump and a pressure storage tank; of a main duct connecting the pump and tank; a duct by-passing a portion of the main duct; and means including a valve mechanism operable to one position for causing the by-pass to be drained and filled with air, and operable to another position for causing air to be forced by the flow of water in the main duct from the by-pass duct to the tank.

3. In a water system, the combination with a pump and a pressure storage tank; of a main duct connecting the pump and tank; a duct by-passing a portion of the main duct; an air inlet provided with a check valve; a drain; a valve operable to one position to connect the by-pass with the air inlet and to a second position to connect the by-pass with the main duct; a valve operable to one position to connect the by-pass with the drain, and to a second position to connect the by-pass with the main duct; a duct from the air passage to the drain; and common means for moving the valve simultaneously into the first and second mentioned positions.

4. In a water system, the combination with a pump and a pressure storage tank; and means utilizing pressure within the system for driving air into the tank, said means including a duct, an air inlet passage having a check valve, a drain for said duct, valves in said duct for controlling the passage of air from the inlet passage to the duct and for controlling the passage of water from the duct to the drain, and a second drain connecting the air passage and said first drain.

5. In a water system, the combination with a pump and a pressure storage tank; of a main duct connecting the pump and tank; a duct by-passing a portion of the main duct; a valve body having a main passage included in the main duct, and having connections with atmosphere and a drain; and valve mechanism within the valve body either for connecting the by-pass with atmosphere and drain or for connecting the valve body with said main passage.

6. In a water system, the combination with a pump and a pressure storage tank; of a main duct connecting the pump and tank; a duct by-passing a portion of the main duct; a valve body having a main passage included in the main duct, and having connections with atmosphere and a drain; and having a duct between said connections; and valve mechanism within the valve body either for connecting the by-pass with atmosphere and drain or for connecting the valve body with said main passage.

7. In an air charger for a water system including a pump and pressure storage tank, the combination with an air tank having an air inlet pipe and a drain pipe; of a valve body having a main passage extending above and below the air tank and adapted to be connected in a water passage from the pump to the storage tank, and having valve seats located above and below the air tank, the upper valve seats having ports connected respectively with the main passage, the air tank, and the air inlet, the lower valve seat having ports connected respectively with the main passage, the air tank, and the drain; and valves for connecting the ports whereby the air tank can be drained and receive air or whereby water can flow into the air tank to force air into the main passage.

8. In an air charger for a water system including a pump and pressure storage tank, the combination with an air tank having an air inlet pipe and a drain pipe; of a valve body having a main passage providing at all times a water passage from the pump to the storage tank; and valve mechanism within the valve body for connecting the air tank with the air inlet and drain, or for connecting the air tank with the main passage whereby water from the main passage may force air from the air tank into the main passage.

9. In an air charger for a water system including a pump and pressure storage tank, the combination with an air tank having an air inlet pipe and a drain pipe; of a valve body having a main passage providing at all times a water passage from the pump to the storage tank; and providing a drain for the air inlet; and valve mechanism within the valve body for connecting the air tank with the air inlet and drain, or for connecting the air tank with the main passage whereby water from the main passage may force air from the air tank into the main passage.

10. In an air charger for a water system including a pump and pressure storage tank, the combination with an air tank having an air inlet pipe and a drain pipe; of a valve body having passages located above the air tank adapted respectively to be connected with a pipe leading to the storage tank, a pipe leading to the air tank, and with the air inlet pipe, and having passages located below the air tank adapted respectively to be connected with a pipe leading from the pump, a pipe leading to the air tank, and with the air tank drain pipe; and valve mechanism within the valve body for connecting the air tank with the air inlet and drain, or for connecting the air tank with the pump and storage tank, said valve body and valves capable of operation in an inverted position with respect to the air tank, the valve body passages which were below the tank adapted to be connected respectively with the pipe connections above the tank, and vice versa.

11. In an air charger for a water system including a pump and pressure storage tank, the combination with an air tank having an air inlet pipe and a drain pipe; of a valve body having provisions adjacent either end thereof either for making connections above the air tank with a pipe leading to the storage tank, a pipe leading to the air tank and with the air inlet, or for making connections below the air tank with a pipe leading from the pump, a pipe leading to the air tank, and with the drain, whereby the body can be used with either end up; and valve mechanism invertible with the body for connecting the air tank either with the air inlet and drain or with the pump and storage tank.

12. In an air charger, a unitary structure comprising in combination an air tank, means for supporting the tank on a stationary part, and means attached to said supporting means and including passages and valve mechanism for connecting the air tank either with a conduit leading to atmosphere and a drain conduit or with a conduit connected with a water pump and a conduit connected to a water storage tank.

13. In an air charger, a unitary structure comprising in combination an air tank, and means attached to the tank and including passages and valve mechanism for connecting the air tank either with a conduit leading to atmosphere and a drain conduit, or connecting the air tank with a water system by a separate conduit whereby the flow of water in the system will cause water to be forced from the air tank into the system.

In testimony whereof we hereto affix our signatures.

GEORGE A. BUVINGER.
CLARENCE WARNER.
JASPER A. SMITH.